April 25, 1961  J. F. SWIFT  2,981,381
SELF-ADJUSTING MEANS FOR BRAKE OR CLUTCH ASSEMBLIES
Filed Dec. 12, 1957
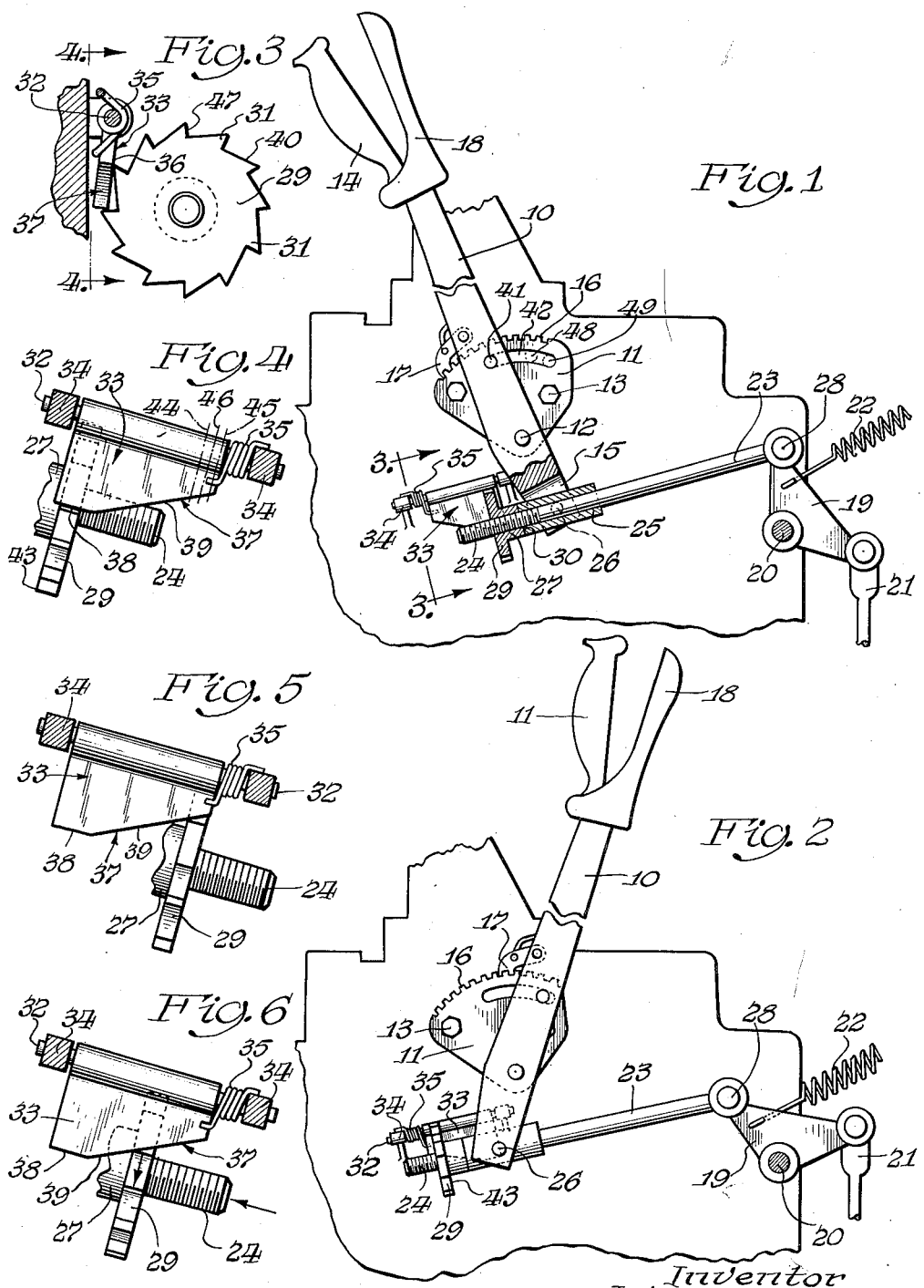
Inventor
John F. Swift
Paul O. Pippel
Attorney United States Patent Office 2,981,381
Patented Apr. 25, 1961

2,981,381

SELF-ADJUSTING MEANS FOR BRAKE OR CLUTCH ASSEMBLIES

John F. Swift, Fort Wayne, Ind., assignor to International Harvester Company, Chicago, Ill., a corporation of New Jersey Filed Dec. 12, 1957, Ser. No. 702,296

9 Claims. (Cl. 188—196)

This invention relates to self-adjusting means for brake or clutch assemblies and more particularly to a new and improved simple device incorporated in the control or operating system of a brake or clutch assembly for automatically compensating for wear of the frictionally engageable parts of the brake and clutch assemblies.

An important object of the present invention is to provide a simple and inexpensive means for automatically adjusting the linkage operatively interconnecting a control lever and a brake or clutch to take up any slack due to wear of the clutch or brake parts occasioned by use thereof.

A further object is the provision of an inexpensive brake slack-adjusting device comprising a very few low cost parts and which is readily adaptable to existing brake control linkages.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a side elevational view of a hand brake lever and a portion of the operating linkage interconnecting the brake lever and the brake; portions of the parts shown therein are broken away to better illustrate the invention;

Figure 2 is a view similar to Figure 1 showing the disposition of the hand brake control lever corresponding to the brake applied position;

Figure 3 is a cross sectional view taken substantially along the line 3—3 of Figure 1;

Figure 4 is a cross sectional enlarged view taken substantially along line 4—4 of Figure 3;

Figure 5 is an enlarged fragmentary side elevational view shoing the relationship of the latch and ratchet wheel with the hand brake control lever in the position shown in Figure 2; and Figure 6 is a side elevational view similar to Figure 5 illustrating the latch and ratchet wheel in another operating position.

Referring to the drawings in detail wherein like reference characters represent like elements throughout the views, a hand brake control lever 10 is shown. It is to be understood that a foot pedal for operating the brakes could be employed in lieu of the hand brake control lever 10 without departing from the spirit and scope of the invention. As is customary, the hand brake control lever 10 is connected directly to the brake shoes of the brake (not shown) by linkage or alternatively with fluid operating devices which, in turn, are associated with the brake shoes. As wear occurs between the various elements of the linkage and the friction facing material of the brake shoes, it is necessary to shorten the effective length of the linkage to insure proper operation of the brake on relatively small movement of the hand brake control lever 10. The present invention is primarily concerned with the means for automatically shortening the operating linkage to compensate for such wear. The hand brake control member 10 is pivotally mounted on a plate 11 by means of a pivot pin 12. The plate, in turn, is securely fastened to a fixed part of the vehicle by means of bolts 13. The upper end of the brake control member 10 is provided with a hand grip portion 14 and the lower end or the end diametrically opposite the hand grip portion 14 is bifurcated as indicated by numeral 15. The normally upper edge of the plate 11 is arcuate in shape and provided with a series of teeth 16 which are adapted to be engaged by a pawl 17 carried by the lever 10. The pawl 17 is resiliently urged into engagement with the teeth 16 to lock the lever 10 with respect to the plate 11. Release means including the handle 18 is provided as in conventional hand levers with lock means for setting the same with respect to a stationary plate for disengaging the pawl 17 from the teeth 16 to permit rocking of the hand control lever 10 with respect to the plate 11.

A bell crank 19 is pivotally mounted on a stationary part of the vehicle by means of a pivot pin 20. One end of a link 21, partially shown in Figures 1 and 2, is pivotally connected to the bell crank 19 and its opposite end is operatively interconnected with the mechanism for operating the brake shoes of the brake. It is to be understood that as the bell crank 19 rotates in a counterclockwise direction as viewed in Figure 1, the brake shoes are caused to move into engagement with the brake drum to effect application of the vehicle brakes. Spring means 22, shown somewhat diagrammatically in Figure 1, act on the bell crank 19 tending to urge the same in a clockwise direction as viewed in Figure 1 to a position corresponding to the brake released position of the brake shoes. One end of a pull rod 23 is pivotally connected to the bell crank 19 and its opposite end is provided with a left-hand threaded section 24. The pull rod 23 loosely extends through the central bore of a sleeve-like member 25. The sleeve-like member 25 carries diametrically oppositely projecting pivot pins 26 which are received in apertures formed in the bifurcated lower end of the control lever 10. Threaded on the end section 24 of the pull rod 23 is an annular abutment member 27. The annular abutment member 27 has a diameter substantially equal to the diameter of the sleever-like member 25 and is adapted to abut one end thereof as shown in Figures 1 and 2. It will be appreciated that the effective length of the operating link extending between the lever 10 and the bell crank 19 is determined by the spacing between the pivot pins 26 and pivot pin 28 pivotally connecting the pull rod 23 to the bell crank 19. It will also be appreciated that the spacing between the pivot pins 26 and the pivot pin 28 depends upon the position of the abutment member 27 on the pull rod 23.

The brake control structure thus far described is somewhat conventional in design and the details thereof are not material to the preset invention except insofar as they act in combination with the automatic wear-compensating means to be described in detail hereinafter. The automatic wear-compensating means includes a ratchet wheel 29 integrally formed with the end of the abutment member 27 opposite the end 30 engaging the end of the sleeve-like member 25. The ratchet wheel 29 is provided with a plurality of ratchet teeth 31 on its periphery. Pivotally mounted on a fixed part of the vehicle by means of a pivot pin 32 is a plate-like pawl 33. The ends of the pivot pin 32 are journalled in bearing supports 34 projecting from a fixed part of the vehicle. The pivotal axis of the pawl 33 is spaced substantially parallel to a vertical plane containing the longitudinal axis of the pull rod 23. A helical wound spring 35 encircles the pivot pin 32 and has one end reacting against the bearing support 34 and its opposite end reacting against the pawl 33. As best illustrated in Figure 3, the spring 35 resiliently urges the pawl 33 in a counter-clockwise direction whereby one flat side surface 36 thereof is yieldably pressed into frictional engagement with the adjacent ratchet tooth 31. The lowermost edge 37 of the pawl 33 serves as a camming means. The camming edge or surface 37 includes a relatively short section 38 which lies in a plane substantially parallel to the pivotal axis of the pawl 33 and a relatively long flat inclined section 39 which extends upwardly toward the pivotal axis of the pawl 33 from the section 38, as illustrated in Figure 4. It will also be noted that the vertical spacing between the ends of the relatively long inclined section 39 is substantially equal to the cord length 40 of a ratchet tooth 31. The purpose of the camming surface 39 will be pointed out presently.

In operation, assuming the vehicle brakes to be fully released, the hand brake control lever 10 is in the position shown in Figure 1. When in this position, a guide pin 41 fixed to the lever 10 is at one end of an arcuate guide slot 42. When the hand brake control lever 10 is in this position the surface 36 bears against one of the ratchet teeth 31, as illustrated in Figure 3. As the lever 10 is rocked in a clockwise direction about pivot pin 12 to apply the vehicle brakes, the pull rod 23 is moved to the left against the resilient action of spring means 22. The ratchet wheel 29 moves in unison with the pull rod 23 to the left and as a result the tooth 31 engaged by the pawl 33 slides across the flat surface 36 thereof. With the brakes properly adjusted and the slack in the linkage system properly compensated the brakes are actuated to their fully engaged position when the hand control lever is swung through a predetermined angle. The guide pin 41 is then in the broken line position shown in Figure 1. When the hand brake control lever 10 is in the position wherein the guide pin 41 is in the broken line position indicated by numeral 48 shown in Figure 1 and the slack in the control linkage system is properly taken up, the trailing surface 43 of the ratchet wheel 29 lies in a plane indicated by a broken line 44 in Figure 4. It will be noted that when in this position the tooth 31 remains engaged with the surface 36 of the pawl 33. Broken line 45 shown in Figure 4 indicates the position of the trailing surface 43 when the pin 41 is at the end of the slot indicated by numeral 49 in Figure 1 opposite the end where the pin 41 is shown in Figure 1, which position corresponds to one limit of the swing permitted of the control lever 10. As the frictionally engageable elements of the brake wear and it is necessary to swing the hand brake control lever 10 beyond the position where the trailing surface 43 of the ratchet wheel 29 is moved to a position indicated by broken line 46 of Figure 4 between the maximum position of the brake control lever 10 and the position necessary when the brakes and slack are properly adjusted, the trailing surface 43 of the ratchet wheel 29 clears the flat surface 36 and as a consequence the spring 35 pivots the pawl 33 about pin 32 to a position wherein the camming edge 39 engages the substantially radially extending portion 47 of the tooth 31. Now as the brake is released as when the control lever 10 is moved in a counterclockwise direction from the position shown in Figure 2 and the pull rod 23 moves to the right under the influence of the spring means 22, the tooth surface 47 rides on the cam surface 39, as shown in Figure 6, and the ratchet wheel 29 and the abutment member 27 integrally formed therewith are turned in a counterclockwise direction as viewed in Figure 3. The turning movement continues until the tooth surface 47 engages the edge portion 38. The ratchet wheel 29 when in this position has rotated a length equal to the cord length 40 of a ratchet tooth 31 and the tip portion of the next adjacent tooth 31 is then in engagement with the flat side surface 33. Inasmuch as the threaded section 24 is provided with left-hand threads, rotation of the ratchet wheel 29 counterclockwise, as viewed in Figure 3, causes the pivot pins 26 to be moved closer to the pivot pin 28. In other words, the effective length of the pull rod 23 is shortened a predetermined amount to compensate for wear of the friction elements of the brake mechanism. The amount is dependent upon the degree of turning movement of the ratchet wheel 33 with respect to the threaded section 24 and upon the coarseness of the cooperating threads of the abutment member 27 and the threaded section 24. The ratchet wheel 29 is turned during each complete brake-applying and releasing operation of the control lever 10 until the ratchet wheel 29 is moved to a position where the trailing edge 43 thereof is moved to a position corresponding to the broken line 44 of Figure 4 and the pin 41 and the hand control lever 10 is in the dotted position indicated by numeral 48 with the brakes fully applied. The above described adjustment of the effective length of the pull rod 23 is automatically made during the brake application and release movement of the control lever 10 whenever the control lever 10 overtravels the position 48 of the pin 41 to apply the brake mechanism because of wear of the brake linings and shoes. Consequently, a uniform clearance is maintained between the shoes and the drum when the brake mechanism is fully released and the hand control lever 10 is in the position shown in Figure 1. If the brake linings and shoes have not worn sufficiently the ratchet wheel 29 merely slides across the surface 36 during movement of the hand control lever 10 without one of the radially extending tooth surfaces 47 engaging the camming surface 39.

The embodiment of the invention chosen for the purposes of illustration and description herein is that preferred for achieving the objects of the invention and developing the utility thereof in a most desirable manner, due regard being had to existing factors of economy, simplicity of design and construction and the improvements sought to be effected. It will be appreciated therefore that the particular structural and functional aspects emphasized herein are not intended to exclude but rather to suggest such other modifications and adaptations of the invention as fall within the spirit and scope of the invention as defined in the appended claims.

What is claimed is:

1. In a vehicle brake operating linkage comprising a pivotally mounted control lever; a sleeve-like member pivotally mounted on one end of said lever; a pull rod having one end adapted to be operatively connected to the brake and its opposite end threaded, said pull rod extending loosely through said sleeve-like member; an annular abutment having internal threading engageable with said threaded end of said pull rod; spring means urging one end of said sleeve-like member into abutting engagement with said abutment; a ratchet wheel concentric with and fixed to said abutment having ratchet teeth formed on its periphery; and means normally out of operative engagement with said ratchet wheel, said means operatively engaging said ratchet wheel automatically upon a predetermined movement of said lever in one direction whereby movement of said lever in the opposite direction effects rotation of said ratchet wheel one tooth length with respect to said rod.

2. In a vehicle brake operating linkage comprising a pivotally mounted control lever swingable between predetermined limits to apply the brake and to permit release of the brake; a sleeve-like member pivotally mounted on one end of said lever; a pull rod having one end adapted to be operatively connected to the brake and its opposite end threaded, said pull rod extending loosely through said sleeve-like member; an annular abutment having internal threading engageable with said threaded end of said pull rod; spring means urging one end of said sleeve-like member into abutting engagement with said abutment; and cam means normally out of operative engagement with said abutment during movement of said control lever between said predetermined limits, said cam means operatively engaging said abutment upon movement of said control lever in one direction beyond one of said predetermined limits of travel thereof whereby return movement of said control lever toward the other predetermined limit of travel of said control lever effects rotation of said abutment.

3. In a vehicle brake operating linkage substantially as set forth in claim 2, in which said cam means is pivotally mounted on an axis contained in a vertical plane horizontally spaced from a vertical plane containing said pull rod, and spring means are provided for yieldably urging said camming means into operative engagement with said abutment.

4. In a vehicle brake operating linkage comprising a control lever mounted on a fixed support swingable in one direction to apply the vehicle brakes and swingable in an opposite direction to permit disengagement of the brakes; a sleeve-like member pivotally mounted on one end of said lever; a pull rod having one end adapted to be operatively connected to the brake and its opposite end provided with an externally threaded end section, said pull rod extending loosely through said sleeve-like member and movable in a vertical plane during swinging movement of said control lever; an annular abutment having internal threading engageable with said threaded end section of said pull rod; spring means urging one end of said sleeve-like member into abutting engagement with said abutment; a ratchet wheel fixed to said abutment having ratchet teeth on its periphery, said ratchet teeth having generally radially extending surface portions and arranged concentric with said abutment; a plate-like pawl pivotally mounted on the fixed support having a flat side surface, the lower edge of which is defined by an inclined flat camming surface, the pivotal axis of said pawl being horizontally spaced from a vertical plane containing said pull rod; spring means for urging said flat side surface of said pawl into tangential abutting engagement with said ratchet wheel whereby said inclined camming surface is maintained out of engagement with said ratchet teeth during swinging movement of said control lever between predetermined limits, said camming surface engaging a respective radially extending surface portion of a ratchet tooth upon movement of said control lever in one direction beyond one of said predetermined limits of travel thereof whereby return movement of said control lever toward the other predetermined limit of travel of said control lever effects rotation of said ratchet wheel.

5. In a vehicle brake operating linkage comprising a control lever pivotally mounted on a fixed support, a sleeve-like member pivotally mounted on one end of said lever; a pull rod having one end adapted to be operatively connected to the brake and its opposite end threaded, said pull rod extending loosely through said sleeve-like member and being movable in a vertical plane perpendicular to the pivotal axis of said control lever when said control lever is rocked; an annular abutment having internal threading engageable with said threaded end of said pull rod; spring means urging one end of said sleeve-like member into abutting engagement with said abutment; a ratchet wheel having ratchet teeth formed on its periphery fixed to said abutment, each of said ratchet teeth having a generally radially extending surface portion; a plate-like pawl mounted on said fixed support for pivotal movement about an axis contained in a vertical plane horizontally spaced from the vertical plane of movement of said pull rod, said plate-like pawl having a flat surface spring-pressed into tangential sliding engagement with said ratchet wheel with movement of said control lever within predetermined limits, a surface of said pawl defining an edge of said flat surface being flat and inclined with respect to the pivotal axis of the pawl, said inclined surface being engageable with a radially extending surface portion of a ratchet tooth upon movement of said lever in one direction beyond one of said predetermined limits of movement thereof whereby said ratchet wheel is rotated with respect to said rod upon movement of said lever in the opposite direction to the other predetermined limit of movement of the lever.

6. In a motor vehicle brake operating linkage comprising a pivotally mounted control lever; an elongated pull rod having one end adapted to be operatively connected to the brake; connecting means for operatively connecting one end of said control lever to said pull rod whereby pivoting of said control lever effects movement of said pull rod, said connecting means including a member mounted on said pull rod and movable with said pull rod, said member being axially adjustable with respect to said pull road along the longitudinal axis of said pull rod to vary the axial position of said member and said one end of said control lever with respect to the end of said pull rod adapted to be operatively connected to the brake; and means operatively engageable with said member for effecting axial adjustment of said member with respect to said pull rod said means normally out of operative engagement with said member, said means operatively engaging said member automatically upon a predetermined pivotal movement of said lever in one direction whereby upon pivotal movement of said lever in the opposite direction adjustment of the axial position of said member with respect to the end of said rod adapted to be operatively connected to the brake is effected.

7. In a vehicle brake operating linkage comprising a pivotally mounted control lever; a pull rod having one end adapted to be operatively connected to the brake; connecting means for operatively connecting one end of said control lever with said pull rod intermediate the ends thereof whereby pivoting of said lever effects movement of said pull rod, said connecting means including a member mounted on said pull rod and movable therewith, said member being axially adjustable with respect to said pull rod along the longitudinal axis of said pull rod to vary the effective length of said pull rod between said end of said pull rod adapted to be operatively connected to the brake and said one end of said control lever; and means normally out of operative engagement with said member, said means operatively engaging said connecting means automatically upon a predetermined movement of said lever in one direction whereby upon movement of said lever in the opposite direction a decrease in the effective length of said pull rod between said one end of said control lever and said member and the said pull rod adapted to be operatively connected to the brake is effected.

8. In a vehicle brake operating linkage comprising a pivotally mounted control lever; a sleeve-like member pivotally mounted on one end of said lever; a pull rod having one end adapted to be operatively connected to the brake and its opposite end threaded, said pull rod extending loosely through said sleeve-like member; an annular abutment mounted on said pull rod and having internal threading engageable with said threaded end of said pull rod, said abutment having an element fixed to one end thereof; spring means urging one end of said sleevelike member into abutting engagement with said abutment whereby pivoting of said control lever effects movement of said sleeve-like member, abutment and pull rod in unison; and means operatively engageable with said element fixed to said abutment for effecting rotation of said abutment with respect to said pull rod, said means normally out of operative engagement with said element, said means operatively engaging said element automatically upon a predetermined movement of said lever in one direction whereby upon movement of said lever in the opposite direction, rotation of said element and consequently said abutment with respect to said rod is effected.

9. In a vehicle brake operating linkage comprising a pivotally mounted control lever; a sleeve-like member pivotally mounted on one end of said lever; a pull rod having one end adapted to be operatively connected to the brake and its opposite end threaded, said pull rod extending loosely through said sleeve-like member; an annular abutment mounted on said pull rod and having internal threading engageable with said threaded end of said pull rod and yieldably urged into abutting engagement with said sleeve-like member, said abutment having ratchet wheel means fixed thereto; and pawl means cooperable with said ratchet wheel means, said pawl means normally being out of operative engagement with said ratchet wheel means, said pawl means being operatively engaged automatically upon a predetermined movement of said lever in one direction whereupon movement of said lever in the opposite direction of rotation of said ratchet wheel means and said abutment with respect to said rod is effected.

References Cited in the file of this patent

UNITED STATES PATENTS

| | | |
|---|---|---|
| 893,220 | Anderson | July 14, 1908 |
| 2,822,893 | Flueler | Feb. 11, 1958 |
| 2,918,991 | Reisch | Dec. 29, 1959 |

FOREIGN PATENTS

| | | |
|---|---|---|
| 274,008 | Germany | May 12, 1914 |